United States Patent [19]

Kroner et al.

[11] Patent Number: 5,576,407
[45] Date of Patent: Nov. 19, 1996

[54] COPOLYMERS OF HYDROXYALKYL VINYL ETHERS FOR USE IN DETERGENTS AND CLEANING AGENTS

[75] Inventors: Matthias Kroner, Eisenberg; Heinrich Hartmann, Limburgerhof; Gerhard Wolf, Mannheim; Richard Baur; Paul Diessel, both of Mutterstadt; Hans-Ulrich Jaeger, Neustadt; Volker Schwendemann, Neustadt; Johannes Perner, Neustadt, all of Germany

[73] Assignee: BASF Aktiengesellschaft, Ludwigshafen, Germany

[21] Appl. No.: 185,971

[22] PCT Filed: Sep. 4, 1992

[86] PCT No.: PCT/EP92/02041

§ 371 Date: Feb. 10, 1994

§ 102(e) Date: Feb. 10, 1994

[87] PCT Pub. No.: WO93/06142

PCT Pub. Date: Apr. 1, 1993

[30] Foreign Application Priority Data

Sep. 13, 1991 [DE] Germany .......................... 41 30 428.4

[51] Int. Cl.$^6$ .......................... C08F 216/16; C08F 220/56
[52] U.S. Cl. ...................... 526/332; 526/333; 526/307.5; 526/329.6; 526/318.5
[58] Field of Search ..................... 526/332, 333, 526/307.5, 312, 329.6, 318.5

[56] References Cited

U.S. PATENT DOCUMENTS

| 26,407 | 12/1859 | Beckers . | |
|---|---|---|---|
| 2,104,004 | 1/1938 | Ackerman . | |
| 2,828,220 | 3/1958 | McWherter | 526/332 |
| 2,981,692 | 4/1961 | Stillo | 526/332 |
| 3,328,468 | 6/1967 | Nowak . | |
| 4,906,397 | 3/1990 | Leighton et al. . | |
| 5,187,201 | 2/1993 | Haubennestel et al. . | |

*Primary Examiner*—Christopher Henderson
*Attorney, Agent, or Firm*—Oblon, Spivak, McClelland, Maier & Neustadt, P.C.

[57] ABSTRACT

Copolymers of hydroxyalkyl vinyl ethers are obtainable by cationic or free radical copolymerization of (a) from 99 to 1% by weight of a hydroxyalkyl vinyl ether, (b) from 1 to 99% by weight of an adduct of a $C_2$–$C_4$-alkylene oxide with a hydroxyalkyl vinyl ether and (c) from 0 to 98% by weight of other copolymerizable monomers, and the stated copolymer and hydroxyalkyl vinyl ethers polymerized by cationic or free radical polymerization, which contain the monomers (a) or (b) as sole monomers or as a mixture with other copolymerizable monomers in the form of polymerized units, are used as additives for detergents and cleaning agents in amounts of from 0.1 to 50% by weight.

7 Claims, No Drawings

COPOLYMERS OF HYDROXYALKYL VINYL ETHERS FOR USE IN DETERGENTS AND CLEANING AGENTS

BACKGROUND OF THE INVENTION

1. Field of the Invention

The present invention relates to copolymers of hydroxyalkyl vinyl ethers, adducts of $C_2$–$C_4$-alkylene oxides with hydroxyalkyl vinyl ethers and/or polytetrahydrofuran vinyl ethers and, if desired, other copolymerizable monomers and the use of the stated copolymers and of hydroxyalkyl vinyl ethers which have been polymerized by cationic or free radical polymerization and contain the monomers (a) or (b) as sole monomers or as a mixture with other copolymerizable monomers, as viscosity depressants for surfactants and as additives for detergents and cleaning agents.

2. Description of the Related Art Including Information Disclosed Under 37 C.F.R. §1.97–1.99

U.S. Pat. No. 2,104,004 discloses a process for the cationic polymerization of vinyl ethers, in which from 0.001 to 5% by weight of a virtually anhydrous inorganic acid are used as the catalyst. Examples of suitable catalysts are aluminum chloride, iron chloride, sulfuric acid, hydrochloric acid and boron trifluoride.

US-B-26 407 discloses the free radical copolymerization of divinyl compounds, such as divinyl ether, divinyldimethylsilane or divinyl sulfone, with monoethylenically unsaturated monomers, e.g. vinyl acetate, maleic anhydride or dimethyl fumarate. Suitable catalysts are peroxy compounds, such as di-tert-butyl peroxide, hydrogen peroxide, alkyl hydroperoxides and diacyl peroxides. Ziegler catalysts are also suitable for initiating the polymerization. The polymers obtainable in this manner are fiber-forming and film-forming and can be used for the production of coatings or packaging materials. They are also suitable as lubricants, lubricant additives and adhesives, and as crosslinking agents for epoxy resins.

U.S. Pat. No. 3,328,468 discloses the preparation of homopolymers of the monovinyl ether of diethylene glycol using polymerization initiators which form free radicals under the polymerization conditions. The hydroxyl group of the monovinyl ethers of diethylene glycol remains virtually unchanged during the free radical polymerization. The polymers obtainable in this manner can replace polyols in foam production. As also disclosed in this publication, monovinyl ethers of diols can be polymerized under the action of cationic initiators with the formation of polyacetals.

EP-A-0 359 055 discloses detergent formulations which contain from 0.5 to 65% by weight of a surfactant and from 1 to 80% by weight of a builder which consists of a polymer which is obtainable by free radical copolymerization of divinyl ether and maleic anhydride in a molar ratio of 1:2 and subsequent hydrolysis of the anhydride groups and neutralization.

EP-A-0 379 166 discloses, inter alia, copolymers of alkyl vinyl ethers and hydroxyl-containing vinyl ethers, such as hydroxyethyl vinyl ether, hydroxypropyl vinyl ether or hydroxybutyl vinyl ether, and alkoxylates of these hydroxyl-containing vinyl ethers. The copolymers are used in coating and molding materials for improving the leveling and as an antifoam.

U.S. Pat. No. 3,131,162 discloses the copolymerization of monovinyl ethers of glycols with vinyl esters of saturated fatty acids having a carbon chain of not more than 6 carbon atoms in the presence of peroxides. The copolymers can be vulcanized to give rubber-like materials with the addition of conventional vulcanization assistants.

OBJECTS OF THE INVENTION

It is an object of the present invention to provide novel substances. It is a further object of the present invention to improve the primary and secondary washing effect of detergents and to reduce the viscosity of aqueous surfactant solutions and detergent slurries.

SUMMARY OF THE INVENTION

We have found that this object is achieved, according to the invention, by copolymers of hydroxyalkyl vinyl ethers which are obtainable by cationic or free radical copolymerization of (a) from 99 to 1% by weight of hydroxyalkyl vinyl ethers, (b) from 1 to 99% by weight of adducts of $C_2$–$C_4$-alkylene oxides with hydroxyalkyl vinyl ethers and/or polytetrahydrofuran vinyl ethers and (c) from 0 to 98% by weight of other copolymerizable monomers.

One of the objects defined above is furthermore achieved by the use of copolymers which are obtainable by cationic or free radical copolymerization of (a) from 99 to 1% by weight of hydroxyalkyl vinyl ethers, (b) from 1 to 99% by weight of adducts of $C_2$–$C_4$-alkylene oxides or tetrahydrofuran with hydroxyalkyl vinyl ethers and (c) from 0 to 98% by weight of other copolymerizable monomers, and of hydroxyalkyl vinyl ethers which have been polymerized by cationic or free radical polymerization and contain the monomers (a) or (b) as sole monomers or as a mixture with other copolymerizable monomers, as additives for detergents in amounts of from 0.1 to 50% by weight.

DESCRIPTION OF THE PREFERRED EMBODIMENTS

Suitable monomers of group (a) are all hydroxyalkyl vinyl ethers which are derived from compounds which have 2 or more OH groups and in which the hydrogen atom of one OH group is replaced by the vinyl group. These compounds can be characterized, for example, with the aid of the following general formula:

$$CH_2=CH-O-R-OH \qquad (I)$$

where R is a divalent or polyvalent radical which may furthermore be substituted, for example R is $C_2$–$C_{20}$-alkylene, phenylene or a $C_3$–$C_{20}$-alkylene or phenylene group substituted by OH groups or by ester groups.

Examples of individual compounds of this type are hydroxyethyl vinyl ether, 3-hydroxypropyl vinyl ether, 2-hydroxypropyl vinyl ether, 2-hydroxy-2-methylpropyl vinyl ether, 2-hydroxybutyl vinyl ether, 3-hydroxybutyl vinyl ether, 4-hydroxybutyl vinyl ether, 2-hydroxy-2-ethylethyl vinyl ether, 3-hydroxy-3-methylpropyl vinyl ether, 3-hydroxy-2-methylpropyl vinyl ether, 3-hydroxy-1-methylpropyl vinyl ether, hydroxypentyl vinyl ether, 6-hydroxyhexyl vinyl ether, 4-hydroxy-1,4-dimethylbutyl vinyl ether, pyrocatechol monovinyl ether, resorcinol monovinyl ether, hydroquinone monovinyl ether, 2-hydroxycyclohexyl vinyl ether, 3-hydroxycyclohexyl vinyl ether, 4-hydroxycyclohexyl vinyl ether, hydroxyheptyl vinyl ether, hydroxyoctyl vinyl ether, 4-(hydroxymethyl)-cyclohexylmethyl vinyl ether, hydroxydecyl vinyl ether and monovinyl ethers of polyhydroxy compounds, such as glyceryl monovinyl ether, erythrityl monovinyl ether, sorbityl monovinyl ether, the monovinyl ether of diethyl tartrate and the monovinyl ether of ethyl 2,2-bis-(hydroxymethyl)propionate, and monovinyl ethers of mono-, di- and trisaccharides, oligosaccharides and esters of sugar acids. For example, the following saccharides may be used: glucose, methylglucoside, butylglucoside, sucrose, palatinose, palatinitol, lactose, maltose, fructose, leucrose, panose, dextrins, isomaltose, trehalurose and raffinose. For example, the following sugar acids can be used: galacturonic acid, galactonic acid, galactenic acid, galactaric acid and gluconic acid. From this group of vinyl ethers, the isomeric hydroxybutyl vinyl ethers, in particular 4-hydroxybut-1-yl vinyl ether, 6-hydroxyhexyl vinyl ether and 4-(hydroxymethyl)-cyclohexylmethyl vinyl ether are preferably used. The monomers of group (a) are present in the copolymers in an amount of from 99 to 1, preferably from 90 to 10, % by weight.

Suitable monomers of group (b) are the adducts of $C_2$–$C_4$-alkylene oxides with the hydroxyalkyl vinyl ethers which are defined above as monomers of component (a). Suitable alkylene oxides are ethylene oxide, propylene oxide, 1,2-butylene oxide, 2,3-butylene oxide and isobutylene oxide. The alkylene oxides are subjected to an addition reaction with the hydroxyalkyl vinyl ethers to give the monomers of components (b). Compounds of this type are known. The monomers of components (b) can, however, also be prepared by vinylation of polyalkylene glycols. Examples of individual monomers of component (b) are the adducts which are obtainable by an addition reaction of 3 mol of ethylene oxide with 1 mol of 3-hydroxypropyl vinyl ether, 4 mol of butylene oxide with 1 mol of 2-hydroxypropyl vinyl ether, 10 mol of ethylene oxide with 1 mol of 2-hydroxy-2-methylpropyl vinyl ether, 3 mol of ethylene oxide with 1 mol of 4-hydroxybutyl vinyl ether, 7 mol of ethylene oxide with 1 mol of 4-hydroxybutyl vinyl ether, 11 mol of ethylene oxide with 1 mol of 4-hydroxybutyl vinyl ether, 25 mol of ethylene oxide with 1 mol of 4-hydroxybutyl vinyl ether, 50 mol of ethylene oxide with 1 mol of 4-hydroxybutyl vinyl ether, 3 mol of propylene oxide with 1 mol of 4-hydroxybutyl vinyl ether, 11 mol of butylene oxide with 1 mol of 4-hydroxybutyl vinyl ether, 1 mol of ethylene oxide with 1 mol of 4-hydroxypentyl vinyl ether, 100 mol of propylene oxide with 1 mol of 6-hydroxyhexyl vinyl ether, 30 mol of ethylene oxide with 1 mol of 4-hydroxy-1,4-dimethylbutyl vinyl ether and 50 mol of ethylene oxide with 1 mol of hydroxyheptyl vinyl ether.

Other suitable monomers of component (b) are, for example, diethylene glycol monovinyl ether, triethylene glycol monovinyl ether, tetraethylene glycol monovinyl ether, polyethylene glycol monovinyl ethers generally, having molecular weights of up to 20,000, and dipropylene glycol monovinyl ether, tripropylene glycol monovinyl ether, tetrapropylene glycol monovinyl ether, dibutylene glycol monovinyl ether, tributylene glycol monovinyl ether and mixed glycols, such as ethylene propylene glycol monovinyl ether, diethylene glycol propylene glycol monovinyl ether.

Block copolymers of alkylene oxides are also suitable, said copolymers being obtainable by subjecting first ethylene oxide and then propylene oxide to an addition reaction with a hydroxyalkyl vinyl ether of the formula I. Other suitable monomers of component (b) are the adducts which are obtainable by subjecting propylene oxide and then ethylene oxide and, if desired, butylene oxide to an addition reaction with compounds of the formula I. Polytetrahydrofuran monovinyl ethers which are obtainable by vinylation of polytetrahydrofurans having molecular weights of from 250 to 4,500 are also useful.

Reaction products of alkylene oxides with monovinyl ethers of polyhydroxy compounds can also be used, for example reaction products of 1 mol of glyceryl monovinyl ether with 25 mol of ethylene oxide, 1 mol of erythrityl monovinyl ether with 7 mol of propylene oxide, 1 mol of sorbityl monovinyl ether with 3 mol of butylene oxide, 1 mol of the monovinyl ether of diethyl tartrate with 11 mol of ethylene oxide, 1 mol of the monovinyl ether of ethyl bis-(hydroxymethyl)-propionate with 25 mol of propylene oxide and 1 mol of glucose monovinyl ether with 50 mol of ethylene oxide. Preferably used monomers of group (b) are adducts of alkylene oxides with hydroxyalkyl vinyl ethers which are water-soluble (for example if not less than 1 g of the alkoxylated compounds dissolve in 1 l of water). In general, from 1 to 100, preferably from 2 to 60, mol of the alkylene oxides are subjected to an addition reaction with 1 mol of hydroxyalkyl vinyl ether. For the preparation of the novel copolymers, however, it is also possible to subject even larger amounts of alkylene oxides to an addition reaction with the compounds of the formula I. Preferred monomers (b) are the adducts of from 1 to 100 mol of ethylene oxide with 1 mol of hydroxybutyl vinyl ether. The monomers (b) are present in the copolymers in an amount of from 1 to 99, preferably from 10 to 90, % by weight.

Suitable monomers (c) are all other monomers which are copolymerizable with the monomers (a) and (b). Examples of these are monoethylenically unsaturated $C_3$–$C_8$-carboxylic acids, such as acrylic acid, methacrylic acid, ethacrylic acid, maleic acid, fumaric acid, aconitic acid and itaconic acid. The esters of the stated carboxylic acids with monohydric $C_1$–$C_{18}$-alcohols or polyhydric $C_2$–$C_8$-alcohols are also suitable, the following esters being examples: methyl acrylate, ethyl acrylate, tert-butyl acrylate, n-butyl acrylate, ethylhexyl acrylate, methyl methacrylate, ethyl methacrylate, n-propyl methacrylate, isopropyl methacrylate, n-butyl methacrylate, isobutyl methacrylate, isopropyl acrylate, monomethyl maleate, dimethyl maleate, monoethyl maleate, diethyl maleate, isopropyl maleate, di-n-propyl maleate, mono-n-butyl maleate, di-n-butyl maleate, monoisodecyl maleate and monoisononyl maleate. If the abovementioned carboxylic acids form anhydrides, the anhydrides can also be used as comonomers in the copolymerization, for example maleic anhydride, acrylic anhydride, methacrylic anhydride and itaconic anhydride. The amides of the carboxylic acids, such as acrylamide and methacrylamide, and nitriles of the stated carboxylic acids, such as acrylonitrile and methacrylonitrile, are also suitable.

Further comonomers of group (c) are vinyl esters which are preferably derived from $C_1$–$C_{18}$-saturated carboxylic acids, e.g. vinyl formate, vinyl acetate, vinyl propionate, vinyl butyrate, vinyl pivalate and vinyl stearate. A further class of compounds of group (c) comprises alkyl vinyl ethers, preferably those which are derived from $C_1$–$C_{18}$-alcohols, such as methyl vinyl ether, ethyl vinyl ether, propyl vinyl ether, n-butyl vinyl ether, tert-butyl vinyl ether, sec-butyl vinyl ether, isobutyl vinyl ether, dodecyl vinyl ether, octadecyl vinyl ether and styrene.

To increase the molecular weight of the copolymers, the crosslinking agents usually used in free radical copolymerization may also be employed as monomers of group (c).

The crosslinking agents contain two or more non-conjugated, ethylenically unsaturated double bonds. Examples of suitable crosslinking agents are N,N'-methylenebisacrylamide, polyethylene glycol diacrylates and polyethylene glycol dimethacrylates, each of which are derived from polyethylene glycols having a molecular weight of from 126 to 8,500, trimethylolpropane triacrylate, trimethylolpropane trimethacrylate, ethylene glycol diacrylate, propylene glycol diacrylate, butanediol diacrylate, hexanediol diacrylate, hexanediol dimethacrylate, diacrylates and dimethacrylates of block copolymers of ethylene oxide and propylene oxide, adducts of ethylene oxide and/or propylene oxide with trimethylolpropane which are diesterified or triesterified with acrylic acid or methacrylic acid, polyhydric alcohols which are diesterified or polyesterified with acrylic acid or methacrylic acid, such as glycerol or pentaerythritol, triallylamine, tetraallylethylenediamine, divinylbenzene, diallyl phthalate, polyethylene glycol divinyl ether, trimethylolpropane diallyl ether, polyethylene glycol divinyl ether, butanediol divinyl ether, pentaerythrityl triallyl ether and/or divinylethyleneurea and/or triallylmonoalkylammonium salts, e.g. triallylmethylammonium chloride. Water-soluble crosslinking agents, e.g. N,N'-methylenebisacrylamide, polyethylene glycol diacrylates, polyethylene glycol dimethacrylates, pentaerythrityl triallyl ether and/or divinylurea, are preferably used.

Preferably used crosslinking agents are divinyl ethers of $C_2$-$C_{20}$-diols, polyalkylene glycols and diphenols, for example 1,2-ethylene glycol divinyl ether, 1,4-butanediol divinyl ether, 1,4-bis-(hydroxymethyl)cyclohexyl divinyl ether and 1,6-hexanediol divinyl ether, diethylene glycol divinyl ether and hydroquinone divinyl ether. If crosslinking agents are used in the free radical polymerization, the amounts employed are from 0.1 to 15, preferably from 0.2 to 5, % by weight. Polytetrahydrofuran divinyl ethers having molecular weights of from 250 to 4,500 can also be used.

In the cationic polymerization, monomers containing two or more vinyl ether groups are preferably used as copolymerizable monomers (c). Divinyl ethers are preferred, all divinyl ethers being suitable, for example the abovementioned divinyl ethers of $C_2$-$C_{20}$-alkanediols or divinyl ethers of polyalkylene glycols in which the polyalkylene glycol segment has a molecular weight of not more than 35,000. In the cationic copolymerization, butanediol divinyl ether, in particular 1,4-butanediol divinyl ether, 1,6-hexanediol divinyl ether and 1,4-bis-(hydroxymethyl)-cyclohexyl divinyl ether are preferably used. The amounts here are not more than 20% by weight, based on the monomers (a) and (b).

For the cationic copolymerization, diols and polyols are also suitable for increasing the molecular weight of the copolymers. $C_2$-$C_{20}$-Diols, e.g. ethylene glycol, propylene glycol, 1,4-butanediol, 1,2-butanediol, 1,3-butanediol, 1,6-hexanediol and polyalkylene glycols having molecular weights of not more than 35,000, for example diethylene glycol, triethylene glycol, tetraethylene glycol, pentaethylene glycol, hexaethylene glycol and dipropylene glycol, copolymers of ethylene oxide and propylene oxide and copolymers of ethylene oxide and butylene oxide or copolymers of ethylene oxide and tetrahydrofuran are preferably used. The copolymers may contain the monomers in random distribution or in the form of blocks. Where they are used, these monomers are present in the copolymerization in amounts of from 0.1 to 20% by weight. Polyalkylene oxides may be formed in the alkoxylation of hydroxyalkyl vinyl ethers (monomer a). In the cationic copolymerization, the monomers containing two or more vinyl ether groups and the compounds having two or more OH groups, for example alkylene glycols, may be used together to obtain polymers having high molecular weights.

However, it is then necessary for the vinyl groups and the OH groups to be present in a roughly equimolar ratio in the monomer mixture.

The monomers (a), (b) and, if required, (c) can be copolymerized by both free radical and cationic copolymerization. In the free radical copolymerization, C—C bonding takes place via the double bonds of the monomers with the formation of polymers.

All free radical donors known for this purpose can be used as initiators. These initiators may be water-soluble or water-insoluble. Water-soluble initiators are, for example, inorganic peroxides, such as potassium, sodium and ammonium peroxodisulfate and hydrogen peroxide. Other suitable initiators are organic peroxides, hydroperoxides, peracids, ketone peroxides, perketals and peresters, for example methyl ethyl ketone hydroperoxide, cumene hydroperoxide, tert-butyl hydroperoxide, 1,1-(di-tert-butylperoxy)-cyclohexane, di-(tert-butyl) peroxide, tert-butyl peroxypivalate, ethylhexyl peroctanoate, tert-butyl monoperoxymaleate, dicyclohexyl peroxydicarbonate, dibenzoyl peroxide, diacetyl peroxide and didecanoyl peroxide, and mixtures of peroxides. Redox systems which contain a reducing component in addition to a peroxy compound are also suitable. Useful reducing components are, for example, cerium(III) and iron(II) salts, sodium sulfide, sodium bisulfite, sodium dithionite, ascorbic acid and sodium formaldehyde sulfoxylate. Suitable initiators are preferably chosen so that the free radical-forming compounds used are those which have a half life of less than 3 hours at the particular polymerization temperature chosen. If the polymerization is first started at a low temperature and is completed at a higher temperature, it is advantageous to use two or more initiators which decompose at different temperatures, ie. first an initiator which decomposes at a lower temperature for starting the polymerization and then an initiator which decomposes at a higher temperature in order to complete the main polymerization. By adding heavy metal salts, for example copper, cobalt, manganese, iron, nickel and chromium salts, to peroxide catalysts, the decomposition temperature of the peroxide catalysts can be reduced.

Other suitable initiators are azo compounds, such as 2,2'-azobisisobutyronitrile, 2,2'-azobis-(2-amidinopropane) dihydrochloride, 2,2'-azobis-(2-methylpropionamidine) dihydrochloride, 2,2'-azobis-(2,4-dimethylvaleronitrile) and dimethyl 2,2'-azobisisobutyrate. Hydrogen peroxide, potassium, sodium and ammonium peroxodisulfate, tert-butyl perpivalate, 2,2'-azobis-(2,4-dimethylvaleronitrile) and di-tert-butyl peroxide are particularly preferably used as initiators in the polymerization. From 0.5 to 10, preferably from 1 to 8, % by weight, based on the monomers to be polymerized, of a free radical initiator or of a mixture of such polymerization initiators are usually used. The amount of initiator used is known to have a considerable effect on the molecular weight of the resulting homo- and copolymers.

The free radical polymerization is preferably carried out in the presence of a diluent. These may be solvents for the monomers and the polymers or merely solvents for the monomers. Examples of suitable solvents are ethers, such as diethyl ether, dibutyl ether, diisobutyl ether, methyl tert-butyl ether, cyclic ethers, e.g. tetrahydrofuran and dioxane, mono- or dialkyl ethers of mono- or polyethylene glycols, e.g. ethylene glycol dimethyl ether, ethylene glycol dibutyl ether, diethylene glycol dimethyl ether, diethylene glycol dibutyl ether, monoalkyl ethers of mono- or polyethylene glycol acetates, such as methylglycol acetate, butylglycol acetate, methyldiethylene glycol acetate and butyldiethylene glycol acetate, and adducts of alkylene oxides of 2 to 4 carbon atoms with $C_1$–$C_{28}$-alcohols or alkylphenols. The molecular weights of these adducts may be up to 8,000, preferably up to 6,000. If 2 or more different alkylene oxides are used for the preparation of the adducts, the alkylene oxide units in the reaction products may be randomly distributed or may be present in the form of blocks. Such reaction products are components of liquid detergents. Since the polymers are used in detergents, they are advantageously prepared in the described adducts as solvents, and the polymer solution obtained can be used directly for the preparation of the detergent formulation. In principle, all nonionic surfactants which are used in detergents can be employed as diluents in the free radical copolymerization.

Preferred solvents for the polymerization are, for example, reaction products of monohydric aliphatic $C_1$–$C_{28}$-alcohols or $C_1$–$C_{18}$-alkylphenols with ethylene oxide, propylene oxide and/or butylene oxide, for example the adducts of from 3 to 11 mol of ethylene oxide with 1 mol of a $C_{13}/C_{15}$-alcohol, adducts of from 5 to 15 mol of ethylene oxide with 1 mol of nonylphenol, adducts of from 7 to 11 mol of ethylene oxide and from 3 to 5 mol of propylene oxide with 1 mol of oleyl alcohol and adducts of from 5 to 15 mol of ethylene oxide with 1 mol of stearyl alcohol or tallow fatty alcohol. Other suitable adducts are those of ethylene oxide, propylene oxide and butylene oxide with polyhydric alcohols, e.g. glycol, diethylene glycol, triethylene glycol, tetraethylene glycol, propylene glycol, dipropylene glycol, block copolymers of ethylene oxide and propylene oxide, glycerol and oligoglycerols. Diethylene glycol and polyethylene glycols having degrees of condensation of up to 25 are particularly preferred from this group of compounds.

Other suitable solvents are $C_1$–$C_6$-alcohols, such as methanol, ethanol, isopropanol, n-propanol, butanols, n-hexanol and cyclohexanol, ketones, e.g. acetone, ethyl methyl ketone and cyclohexanone, esters, e.g. ethyl acetate, and water and mixtures of water with water-soluble organic solvents. If an inert solvent is used in the polymerization, the concentrations of the monomers therein are from 10 to 90, preferably from 15 to 70, % by weight.

The polymerization of the monomers of groups a) to c) can, if required, additionally be carried out in the presence of regulators. Examples of suitable regulators are mercapto compounds, such as mercaptoethanol, mercaptopropanol, mercaptobutanol, mercaptoacetic acid, mercaptopropionic acid, butyl mercaptan and dodecyl mercaptan. Other suitable regulators are allyl compounds, such as allyl alcohol, aldehydes, such as formaldehyde, acetaldehyde, propionaldehyde, n-butyraldehyde and isobutyraldehyde, formic acid, ammonium formate, propionic acid, hydroxylammonium sulfate and butenols. Regulators are used in particular when relatively large amounts of crosslinking monomers of group c) are used in the polymerization. Because of the use of the regulators, water-soluble polymers or polymers which are readily dispersible in water are obtained in such cases.

The copolymerization can also be carried out in the absence of diluents. This procedure is very particularly suitable when hydroxyalkyl vinyl ethers having a higher degree of ethoxylation are used as monomers of component (b), for example in the case of reaction products of 4-hydroxybutyl vinyl ether with 3, 7, 11, 25 or 50 mol of ethylene oxide per mol of 4-hydroxybutyl vinyl ether and dimethyl maleate or diethyl maleate as monomers of component (c).

The progress of the copolymerization can be readily monitored on the basis of the decrease in the vinyl ether content of the reaction mixture, with the aid of iodine titration. After the polymerization, residual vinyl ether terminal groups can be cleaved by treating the polymers in an aqueous acidic medium. The resulting acetaldehyde can readily be removed from the aqueous polymer solution with the aid of a steam distillation. Copolymers which are virtually free of residual monomers can be prepared in this manner.

The copolymers can be further modified after the polymerization. For example, copolymers which contain the monomers (a) and (b) and, as monomer (c), an ester of an ethylenically unsaturated carboxylic acid in the form of polymerized units can be converted into a carboxylate-containing copolymer by treatment with an aqueous base, for example sodium hydroxide solution, with ester hydrolysis. Another possibility is to allow hydroxylamine, ammonia or an amine to act on novel copolymers containing polymerized ester groups so that hydroxamic acids or carboxamides are obtained. Here, a large number of secondary reactions for modifying the novel copolymers are possible.

The monomers (a), (b) and, if required, (c) can also be subjected to cationic polymerization. Here, the OH group of one monomer undergoes an addition reaction with the vinyl ether group of the neighboring molecule with the formation of an acetaldehyde acetal. This polymerization results in a polymeric main chain in which the monomer units are bonded to one another by acetaldehyde acetals. The cationic copolymerization of the monomers of groups (a) and (b) can be initiated with the aid of all organic or inorganic acidic substances. Examples of suitable cationic initiators are oxalic acid, tartaric acid, adipic acid, succinic acid, succinic anhydride, citric acid, formic acid, acetic acid, propionic acid, malic acid, mono- or polyhalogenated carboxylic acids, such as trifluoroacetic acid or trichloroacetic acid, hydrogen chloride, hydrogen bromide, hydrogen iodide, sulfuric acid, phosphoric acid, benzenesulfonic acid, p-toluenesulfonic acid, boric acid, ascorbic acid, acidic alumina, aluminum sulfate, potassium aluminum sulfate, iron(II) sulfate, iron(III) sulfate, alumina, titanyl sulfate, iron(III) chloride, boron trifluoride, boron trichloride, boron tribromide, iodine, ion exchangers in the acidic form and acid-laden inert solid substances. The initiators for the cationic polymerization are usually used in amounts of from 0.001 to 20, preferably from 0.01 to 1, % by weight, based on the monomers of groups (a) and (b). The copolymerization is highly exothermic. The reaction temperatures are from –20° to 250° C., preferably from 0° to 200° C. depending on the activity of the initiator used.

For example, in the presence of from 0.1 to 5% by weight of p-toluenesulfonic acid, the monomers (a) and (b) react completely in an exothermic reaction at as low as 40° C. in the course of 10 minutes. If 0.2% by weight of oxalic acid is used for initiating the copolymerization, the copolymerization is complete in the course of 1 hour at 90° C. and in the course of only 10 minutes at 130° C. However, it is also possible to carry out the copolymerization initiated by oxalic acid in the course of a few seconds at 200° C. In the case of initiation by means of relatively weak acids (tartaric aicd, oxalic acid or citric acid), temperatures above 70° C. are generally chosen, whereas when strong acids, such as toluenesulfonic acid, are used, the reaction temperatures are kept below 70° C. The copolymerization generally gives colorless oils or resins which have very high heat stability when oxalic acid and tartaric acid are used as catalysts. The copolymers thus prepared are stable to 250° C.

The cationic polymerization of the monomers (a) and (b) is preferably carried out in the absence of a solvent. However, it is also possible for inert diluents to be present. This may be advantageous in certain cases because the heat of reaction can then be readily removed with the aid of the evaporating diluent. When a strong acid is used as an initiator, a solution of the initiator in a diluent is preferably employed, for example a 0.005–10, particularly preferably 0.01–5, % strength by weight solution of p-toluenesulfonic acid in toluene.

Suitable diluents for the cationic copolymerization are all diluents which carry no functional groups capable of reacting with vinyl ethers. Preferably used diluents are those which are readily obtainable in anhydrous form and are not hygroscopic. Examples of suitable diluents are ethyl acetate, diethylene glycol diethyl ether, ethoxyethyl acetate, butoxyethyl acetate, aliphatic hydrocarbons, such as pentane, hexane, cyclohexane, n-heptane, n-octane and isooctane, and aromatic hydrocarbons, such as toluene, xylene, mesitylene, tetralin and anisole. Other suitable solvents are tetrahydrofuran, dioxane and decalin, acetone, methyl ethyl ketone and cyclohexanone.

The copolymerization can be carried out, for example, as a single-vessel reaction. For this purpose, monomers of groups (a) and (b) and, if required, (c) can be mixed in a reaction vessel in the absence of atmospheric humidity, the initiator can be added and the mixture can be heated to the required reaction temperature. In a preferred embodiment, the total amount of initiator is initially taken in the reaction vessel at 20° C., together with 10% of the monomer mixture to be polymerized, comprising components (a), (b) and, if required, (c), and the polymerization reaction is started, preferably under an inert gas atmosphere, by heating the components initially taken in the reaction vessel. The mixture is stirred during this procedure and also during the subsequent copolymerization. As soon as the polymerization has started, the remaining monomer mixture of the compounds of components (a), (b) and (c) is added continuously or batchwise to the initially taken mixture at a rate such that the heat of polymerization can be reliably removed. If oxalic acid, tartaric acid or citric acid is used as the initiator, temperatures of from about 70° to about 160° C. are required for starting the copolymerization of the monomers (a), (b) and, if required, (c). The acids then dissolve in the monomer mixture to give a homogeneous solution, and the polymerization begins.

In the case of initiators which do not dissolve in the monomer mixture, the heterogeneous reaction mixture is heated to a temperature in the range of from 100° to 250° C. until the polymerization starts.

After the copolymerization, the initiator is either separated off or deactivated. Deactivation of the catalyst is advisable because, in the presence of acidic substances and water or of other protic solvents, the copolymers undergo hydrolysis with a reduction in the molecular weight. To deactivate the initiator, an alkali, preferably sodium bicarbonate, sodium hydroxide solution, potassium hydroxide solution, sodium carbonate, potassium carbonate, ammonium carbonate, an amine, such as ammonia, methylamine, dimethylamine, trimethylamine, ethylamine, diethylamine, dibutylamine, tributylamine, ethanolamine, diethanolamine, triethanolamine or morpholine, or a salt of a strong base and a weak acid, such as sodium acetate, sodium formate or potassium bicarbonate, is added to the reaction mixture after the end of the copolymerization and if necessary after cooling of the reaction mixture. Calcium oxide, calcium hydroxide, basic alumina and basic ion exchangers are also suitable for deactivating the acidic initiators. Insoluble initiators can readily be removed by filtering them off.

After deactivation or separation of the initiator, the copolymer can be converted into a polymer solution or a dispersion by adding water. The copolymer solutions can be purified by subjecting them to steam distillation, and volatile components can be distilled off. During the steam distillation, the pH of the aqueous medium should be above 7. Copolymers which have been subjected to steam distillation do not become discolored if they are subjected to an alkali aftertreatment.

The copolymers may contain from 99 to 1, preferably from 90 to 10, % by weight of one or more monomers of group (a) and from 1 to 99, preferably from 10 to 90, % by weight of one or more monomers of group (b) as polymerized units. The monomers are preferably chosen so that water-soluble or water-dispersible copolymers are formed. By varying the mixing ratios of monomers of group (b) and monomers of group (a), the solubility of the resulting copolymers in water can be influenced. Depending on the ratio of the polymerized monomers of groups (a) and (b), the copolymers in the form of 1% strength by weight aqueous solutions at a pH of 7.5 have turbidity points of from 0° to 100° C. preferably from 5° to 85° C. By increasing the molecular weight, the turbidity point of the copolymers can be reduced while the ratio of monomers of groups (a) and (b) is kept constant. The molecular weight of the copolymers can be influenced by the amount of initiator. An increasing amount of initiator leads to copolymers having a low molecular weight. Furthermore, the molecular weight of the copolymers can be influenced by the presence of copolymerizable monomers of group (c). As stated above, divinyl ethers and compounds containing two or more OH groups are suitable comonomers (c) which increase the molecular weight of the copolymers in the cationic copolymerization of (a) and (b).

If, in the preparation of the monomers (b) by alkoxylation of the monomers of group (a), polyalkylene glycols which cannot be readily separated off are present as impurities, these mixtures of alkoxylated hydroxyalkyl vinyl ethers and polyalkylene glycols can be used in the copolymerization. Being diols, polyalkylene glycols limit the molecular weight in the polymerization of monomers of groups (a) and (b). In this case, an equimolar amount, based on the OH groups, of vinyl ether groups is added in the form of divinyl ethers, so that copolymers having higher molecular weights are obtained. If the divinyl ethers are used in a superstoichiometric amount relative to the polyalkylene glycols, they limit the molecular weight. Where they are present in the copolymerization, the divinyl ethers are used in amounts of not more than 10% by weight.

The copolymers of cationically polymerized monomers (a), (b) and, if required, (c) are unstable in aqueous solutions below pH 7. Under these conditions, hydrolytic cleavage of the copolymers occurs. For example, copolymers which are prepared by cationic polymerization of the monomers (a) and (b) are hydrolyzed in aqueous solution in the course of from 10 to 20 days at a pH of 6.2, in the course of from 1 to 10 days at a pH of 5.3, in the course of from 1 to 30 hours at a pH of 4.7 and in the course of from 1 to 90 minutes at a pH of 2.5. Attention should therefore be paid to the sensitivity of the copolymers to acids during processing and storage. The copolymers are used as detergent additives.

In addition to the novel copolymers, the homopolymers of the monomers (a) and (b) which have been prepared by free radical or cationic polymerization can also be used as detergent additives. Such homopolymers are part of the prior art. Furthermore, the known copolymers of hydroxyalkyl vinyl ethers and other monomers copolymerizable therewith can be used as detergent additives. These copolymers contain not less than 1% by weight of one or more hydroxyalkyl vinyl ethers of component (a) and one or more monomers of the above-mentioned component (c). Other suitable detergent additives are copolymers of the monomers (b) and the monomers (c). The monomers of component (b) are present in polymerized form in these copolymers in an amount of not less than 1% by weight. The copolymers which contain either (a) or (b) as typical monomers can be prepared by cationic or free radical copolymerization. Some polymers of this type are known for other applications from the prior art cited above. Of particular interest are copolymers of 4-hydroxybutyl vinyl ether and vinyl acetate, 4-hydroxybutyl vinyl ether and acrylic acid or methacrylic acid, 4-hydroxyalkyl vinyl ether and diethyl or dimethyl maleate, and 4-hydroxyalkyl vinyl ether and maleic anhydride.

Preferably used copolymers which contain monomers of group (b) as typical building blocks are, for example, copolymers of (1) the reaction product of 1 mol of 4-hydroxybutyl vinyl ether with 3 mol, 7 mol, 11 mol, 25 mol and 50 mol of ethylene oxide and (2) diethyl maleate, dimethyl maleate, acrylic acid, methacrylic acid, maleic anhydride, methyl (meth)acrylate, butyl (meth)acrylate, tert-butyl acrylate or ethyl acrylate, and terpolymers of (1) the reaction product of 4-hydroxybutyl vinyl ether with from 3 to 25 mol of ethylene oxide, (2) acrylic acid, methacrylic acid, maleic anhydride or diethyl maleate and (3) vinyl acetate.

The novel copolymers and the hydroxyalkyl vinyl ethers which are prepared by cationic or free radical polymerization and contain monomers (a) or (b) as sole monomers or as a mixture with other copolymerizable monomers in polymerized form have K values of from 9 to 100, preferably from 10 to 70 (determined according to H. Fikentscher in 1% strength solution in tetrahydrofuran at 25° C.).

The homo- and copolymers described above can be used as viscosity depressants for surfactants. When concentrated surfactant formulations containing little or no water are diluted with water, as is usual in commercial laundries or in the preparation of detergent formulations, a concentration range having a very high viscosity is frequently encountered. This phenomenon is often troublesome in the transport of the formulations in pipelines, in metering with the aid of pumps and with regard to the rate of dissolution in the wash liquor. In the case of high viscosity, a large amount of mechanical energy must be used in order to process the surfactants. In addition, the further dissolution of the surfactants takes a longer time owing to the high viscosity of a partially diluted surfactant. The increase in the viscosity of surfactants on dilution with water occurs in particular in the case of nonionic surfactants, in particular polyalkoxylated compounds. If the copolymers described above are added in amounts of from 0.1 to 50, preferably from 0.5 to 10, % by weight to the surfactants, the viscosity of such mixtures on dilution can be substantially reduced. The homo- and copolymers to be used according to the invention are preferably first dissolved or dispersed in the concentrated surfactant. Thereafter, the mixture is diluted by adding water. The surfactant concentrate to which said polymers have been added can also be introduced into an aqueous wash liquor. However, it is also possible to add said polymers to a highly viscous dilute aqueous surfactant solution to which water has already been added, in order subsequently to reduce the viscosity.

The novel copolymers are used as additives for detergents and cleaning agents.

The detergents and cleaning agents contain, as essential components, not only the polymers described above but at least one anionic surfactant, one nonionic surfactant or a mixture thereof. The detergents and cleaning agents may be in the form of a powder or a liquid formulation. The copolymers to be used according to the invention are particularly suitable for the preparation of liquid detergent formulations. Examples of suitable anionic surfactants are sodium alkylbenzenesulfonates, fatty alcohol sulfates and fatty alcohol polyglycol ether sulfates.

Individual compounds of this type are, for example, $C_8-C_{12}$-alkylbenzenesulfonates, $C_{12}-C_{16}$-alkanesulfonates, $C_{12}-C_{16}$-alkylsulfates, $C_{12}-C_{16}$-alkylsulfosuccinates and sulfated ethoxylated $C_{12}-C_{16}$-alkanols. Other suitable anionic surfactants are sulfated fatty alkanolamides, fatty monoglycerides or reaction products of from 1 to 4 mol of ethylene oxide with primary or secondary fatty alcohols or alkylphenols, as well as fatty esters or fatty amides of hydroxy- or aminocarboxylic acids or -sulfonic acids, for example the fatty sarcosides, glycolates, lactates, taurides or isothionates. The anionic surfactants may be in the form of the sodium, potassium and ammonium salts and soluble salts of organic bases, such as mono-, di- or triethanolamine or other substituted amines. The anionic surfactants also include the conventional soaps, ie. the alkali metal salts of the natural fatty acids.

For example, adducts of from 3 to 40, preferably from 4 to 20, mol of ethylene oxide with 1 mol of a fatty alcohol, an alkylphenol, a fatty acid, a fatty amine, a fatty amide or an alkanesulfonamide can be used as nonionic surfactants. Of particular importance are the adducts of from 5 to 16 mol of ethylene oxide with coconut or tallow fatty alcohols, with oleyl alcohol or with synthetic alcohols of 8 to 18, preferably 12 to 18, carbon atoms, and with mono- or dialkylphenols where the alkyl radicals are of 6 to 14 carbon atoms. In addition to these water-soluble nonionics, however, polyglycol ethers which have from 1 to 4 ethylene glycol ether radicals in the molecule and are water-insoluble or not completely water-soluble are also of interest, particularly when they are used together with water-soluble nonionic or anionic surfactants. Other suitable nonionic surfactants are the water-soluble adducts of ethylene oxide with polypropylene glycol ether, alkylenediaminopolypropylene glycol and alkylpolypropylene glycols where the alkyl chain is of from 1 to 10 carbon atoms, which adducts contain from 20 to 250 ethylene glycol ether groups and from 10 to 100 propylene glycol ether groups, and in which the polypropylene glycol ether chain acts as a hydrophobic radical. Nonionic surfactants of the amine oxide or sulfoxide type can also be used.

The foaming power of the surfactants can be increased or reduced by combining suitable surfactant types. A reduction can also be achieved by adding nonsurfactant organic substances.

The liquid, aqueous detergents contain from 10 to 50% by weight of surfactants. They may contain an anioinic or nonionic surfactant in the stated amount. However, it is also possible to use mixtures of anionic and nonionic surfactants. In such a case, the content of anionic surfactants in the liquid detergent is chosen as 10–30% by weight and the content of nonionic surfactants in said detergent is chosen as 5–20% by weight, based on the total detergent formulation.

The polymers may also be used in concentrated liquid detergents, compact detergents and zeolite-containing detergents. They are also employed in detergents containing sheet silicates. Liquid detergents contain, as essential components, the copolymers to be used according to the invention, in amounts of from 0.1 to 20, preferably from 1 to 10, % by weight, and may contain water in amounts of from 10 to 80% by weight.

Liquid detergents may also contain further substances for the purpose of modification. These include, for example, alcohols, such as ethanol, n-propanol and isopropanol. These substances may be used in amounts of from 3 to 8% by weight, based on the total detergent formulation. The liquid detergents may furthermore contain hydrotropic substances. These are understood as being compounds such as 1,2-propanediol, cumene sulfonate and toluene sulfonate. If such compounds are used for modifying the liquid detergents, their amount is from 2 to 5% by weight, based on the total weight of the liquid detergent. In many cases, the addition of complexing agents has also proven advantageous for the purpose of modification. Examples of complexing agents are ethylenediaminetetraacetic acid, nitrilotriacetate and isoserinediacetic acid as well as phosphonates, such as aminotrismethylenephosphonic acid, hydroxyethanediphosphonic acid, ethylenediaminetetramethylenephosphonic acid and salts thereof. The complexing agents are used in amounts of from 0.1 to 10% by weight, based on the liquid detergent. The liquid detergents may furthermore contain citrates, di- or triethanolamine, turbidity agents, optical brighteners, enzymes, perfume oils and dyes.

If they are used for modifying the liquid detergents, these substances are present together in amounts of not more than 5% by weight. The liquid detergents are preferably phosphate-free. However, they may also contain phosphates, for example pentasodium triphosphate and/or tetrapotassium pyrophosphate. If phosphates are used, the amount of phosphates is from 10 to 25% by weight, based on the total formulation of the liquid detergent and calculated as pentasodium triphosphate. The liquid detergents can also contain sodium aluminum silicate (zeolite A). The amounts thereof which are used are in general from 10 to 30% by weight. In structured, zeolite-containing liquid detergents, the novel copolymers have a homogenizing and stabilizing effect, owing to their good dispersing properties.

Compared with detergent powders, the liquid detergents described above have the advantage that they are readily meterable and have a very good fat-dissolving and oil-dissolving power at relatively low washing temperatures in the case of fat-soiled laundry. Liquid detergents have high contents of detergent substances which remove dirt from the textile at washing temperatures as low as from 40° to 60° C. It has not been possible to date to make use of the dispersing properties of polymers in aqueous liquid detergents because, owing to the high electrolyte concentrations in the detergents, it was not possible to obtain stable solutions with polymers. Using the homo- and copolymers to be employed according to the invention, it is now possible to prepare stable aqueous solutions of liquid detergents and substantially to improve the washing properties of liquid detergents. The activity of said homo- and copolymers in liquid detergents is demonstrated in the Examples with the aid of the primary and secondary washing effect of these detergents. The primary washing effect is understood as the actual removal of dirt from the textile material. The difference in the whiteness between the unwashed and the washed textile material after a wash is determined as the degree of dirt removal. Cotton, cotton/polyester and polyester fabrics with standard soiling are used as the textile test material. After each wash, the whiteness of the fabric in % reflectance is determined using an Elrepho 2000 photometer from Datacolor.

The secondary washing effect is understood as the effects which arise as a result of the redeposition of the dirt detached from the fabric on the fabric in the wash liquor. The secondary washing effect is visible only after a plurality of washes, for example 3, 5, 10 or even as many as 20 washes, and is evident from increasing redeposition, ie. accumulation of dirt from the wash liquor on the fabric. To determine the tendency to redeposition, standard soiled fabric is washed several times together with white test fabric, and the soiled fabric is replaced after each wash. Dirt which is detached from the soiled fabric and deposited on the white test fabric during the wash results in a decrease in whiteness, which is measured. The homo- and copolymers to be used according to the invention in detergents, or water-soluble salts of said homo- and copolymers, can also be employed for formulating detergent powders.

The composition of detergent powder formulations can differ very greatly. Phosphate-free detergent formulations, in particular concentrated compact detergent powders, can contain not only the conventional surfactant components but also, as builders, zeolites and/or sheet silicates in the form of crystalline and amorphous hydrated sodium waterglasses in powder form. The same applies to the composition of cleaning agent formulations. Detergent and cleaning agent formulations usually contain surfactants and may contain builders. This applies both to liquid and to powder detergent and cleaning agent formulations. Examples of the composition of detergent formulations which are commonly used in Europe, the USA and Japan are to be found, for example, in Chemical and Engn. News, 67 (1989), 35, in the form of tables, and in Ullmanns Encyklopädie der technischen Chemie, Verlag Chemie, Weinheim 1983, 4th Edition, pages 63–160.

In the Examples which follow, percentages are by weight. The K values were determined according to H. Fikentscher, Zellulosechemie, 13 (1932), 58–64 and 71–74, the determination being carried out, unless stated otherwise, in 1% strength by weight solution in tetrahydrofuran at 25° C.

EXAMPLES

The following abbreviations were used in the Examples:

HBVE: 4-Hydroxybutyl vinyl ether

HBVE . x EO: Reaction product of 1 mol of 4-hydroxymethyl vinyl ether with x mol of ethylene oxide Surfactant A: Reaction product of 1 mol of $C_{13}$-/$C_{15}$-alcohol with 7 mol of ethylene oxide tBPP: tert-Butyl perpivalate THF: Tetrahydrofuran PEG 300: Polyethylene glycol having a molecular weight of 300

SC: Solids content

Detergents which contain crystalline sheet silicates are described in: Seifen, Öle, Fette, Wachse 116, 20 (1990), 805–808.

VEG: Iodometrically determined vinyl ether terminal groups in the copolymer

AA: Acrylic acid

VAc: Vinyl acetate

HHVE: 6-Hydroxyhexyl vinyl ether

DEM: Diethyl maleate

General method for the preparation of copolymers of 4-hydroxybutyl vinyl ether, ethoxylated 4-hydroxybutyl vinyl ether and ethyl maleate

EXAMPLES 1 TO 5

The amounts, stated in Table 1, of 4-hydroxybutyl vinyl ether, ethoxylated 4-hydroxybutyl vinyl ether and diluent (reaction product of 1 mol of $C_{13}$-/$C_{15}$-alcohol with 7 mol of ethylene oxide=surfactant A) are initially taken in a 500 ml round-bottomed flask provided with a stirrer, a thermometer, an apparatus for working under inert gas and three feed vessels, and 5 g of sodium bicarbonate are added. The initially taken monomer mixture is then heated to 70° C. under nitrogen. As soon as this temperature has been reached, feeds 1 and 2 are begun simultaneously. The feed times are 2 hours in each case. Thereafter, the reaction mixture is stirred for a further 2 hours at this temperature. 50% strength by weight solutions of copolymers in a nonionic surfactant are obtained. The copolymers have the K values stated in Table 1.

TABLE 1

| Example | HBVE [g] | HBVE · x EO [g] | x | Surfactant A [g] | Feed 1 DEM [g] | Surfactant A [g] | Feed 2 tBPP [g] | K value |
|---|---|---|---|---|---|---|---|---|
| 1 | 14 | 93 | 3 | 107 | 86 | 86 | 6 | 14 |
| 2 | 16 | 85 | 7 | 101 | 60 | 60 | 6 | 14 |
| 3 | 23 | 78 | 11 | 100 | 57 | 57 | 6 | 15 |
| 4 | 25 | 80 | 25 | 105 | 49 | 49 | 6 | 16 |
| 5 | 50 | 50 | 25 | 100 | 84 | 84 | 6 | 16 |

EXAMPLES 6–10

These copolymers are prepared at 70° C. using the starting materials stated in Table 2, by the procedure according to Examples 1 to 5, and are then subjected to an alkaline aftertreatment. 50% strength by weight solutions of copolymers in a nonionic surfactant are obtained. The copolymers have the K values stated in Table 2. The amount of water stated in Table 2 is added to the 50% strength copolymer solutions, and cooling is effected in an ice bath to 5° C. The amounts, stated in Table 2, of 50% strength aqueous sodium hydroxide solution are then added in the course of 30 minutes with continuous cooling, and the mixture is stirred for a further 5 hours while cooling in an ice bath and is then allowed to warm up to 20° C. The composition of the copolymer solutions thus obtained is shown in Table 2.

EXAMPLE 11

50 g of 4-hydroxybutyl vinyl ether, 50 g of a reaction product of 4-hydroxybutyl vinyl ether with 7 mol of ethylene oxide and 100 g of polyethylene oxide having a molecular weight of 300 are initially taken in a 500 ml round-bottomed flask provided with a stirrer, a thermometer, an apparatus for working under nitrogen and two metering apparatuses and the mixture is heated to 70° C. As soon as this temperature has been reached, 39 g of acrylic acid and, simultaneously from the other metering apparatus, 6 g of tert-butyl perpivalate are metered in over 1 hour. After the end of the addition of acrylic acid and an initiator, the reaction mixture is stirred for a further 30 minutes at 75° C., after which 50 g of water are added and the solution is heated to 100° C. Volatile components are removed from the mixture by passing in steam. Thereafter, the reaction mixture is allowed to cool to 20° C. and is neutralized by adding 28 g of solid, anhydrous sodium carbonate. Stirring for 5 hours at 20° C. gives a solution of the neutralized polymer in a mixture of water and polyethylene glycol. Small amounts of undissolved sodium carbonate are filtered off via a filter cloth. The polymer content of the solution is 26%. The copolymer has a K value of 61 (measured in 1% strength aqueous solution at 25° C.).

EXAMPLE 12

A copolymer is prepared by the method stated in Example 11, by metering a mixture of 28 g of acrylic acid and 28 g of a polyethylene glycol having a molecular weight of 300 as feed 1 and 3 g of tert-butyl perpivalate as feed 2, in the course of 1 hour, into an initially taken mixture of 100 g of

TABLE 2

| | Substances taken | | | Surfactant A | Feed 1 | Surfactant A | Feed 2 | | | Aftertreatment | Composition of the reaction |
|---|---|---|---|---|---|---|---|---|---|---|---|
| | HBVE | HBVE · x EO | | | DEM | | tBPP | K | Water | NaOH 50% strength | mixture co-polymer/sur-factant |
| Example | [g] | [g] | x | [g] | [g] | [g] | [g] | value | [g] | [g] | A/water [g] |
| 6 | 50 | 50 | 3 | 100 | 111 | 111 | 6 | 16 | 300 | 18 | 29/29/42 |
| 7 | 50 | 50 | 7 | 100 | 98 | 98 | 6 | 15 | 300 | 18 | 27/27/46 |
| 8 | 50 | 50 | 11 | 100 | 91 | 91 | 6 | 15 | 300 | 18 | 28/28/44 |
| 9 | 23 | 78 | 11 | 101 | 57 | 57 | 6 | 15 | 200 | 12 | 30/30/40 |
| 10 | 25 | 80 | 25 | 105 | 49 | 49 | 6 | 16 | 300 | 18 | 22/22/56 | a polyethylene glycol having a molecular weight of 300, 20 g of 4-hydroxybutyl vinyl ether and 80 g of the adduct of 7 mol of ethylene oxide with 1 mol of 4-hydroxybutyl vinyl ether. After adding 50 g of water to the reaction mixture, the latter is heated to 100° C. and volatile components are removed by passing in steam. 19 g of anhydrous sodium carbonate are then added to the reaction mixture. After filtration, a 28% strength copolymer solution in a mixture of water and polyethylene glycol is obtained. The copolymer has a K value of 42 in 1% strength aqueous solution at 25° C.

EXAMPLES 13-16

The amounts, stated in Table 3, of 4-hydroxybutyl vinyl ether and ethoxylated 4-hydroxybutyl ether are initially taken in a 500 ml round-bottomed flask provided with a stirrer, a thermometer, an apparatus for working under nitrogen and two metering units and are heated under the nitrogen atmosphere to 75° C. As soon as this temperature has been reached, feeds 1 and 2 are begun simultaneously. The feed times are 1 hour in each case. After the end of feeds, samples are taken continuously from the reaction mixture and are subjected to iodine titration to determine vinyl ether terminal groups. Table 3 shows the concentrations of vinyl ether terminal groups in mmol after a polymerization time of 3 hours. In order to destroy the remaining vinyl ether groups, 200 g of water and 1 g of 30% strength aqueous hydrochoric acid are added to the copolymer, and the volatile components are removed with the aid of steam distillation. After cooling, the reaction mixture is neutralized by adding 3 ml of 25% strength aqueous sodium hydroxide solution. The K values of the copolymers and the solids content of the reaction solutions are shown in Table 3. The copolymers no longer contain any detectable vinyl ether groups.

EXAMPLES 17-28

0.15 g of anhydrous oxalic acid powder was initially taken in a 250 ml three-necked flask provided with a stirrer, a nitrogen inlet, a thermometer and a reflux condenser with a bubble counter. The mixture of 4-hydroxybutyl vinyl ether and ethoxylated hydroxybutyl vinyl ether, stated in each case in Table 4, is then added in one portion and mixing is carried out at 20° C. until the oxalic acid has been finely distributed in the monomer mixture. The reaction mixture is then heated to 100° C. the oxalic acid dissolving in the monomer mixture to give a clear solution. The exothermic copolymerization begins at the same time and results in the temperature of the reaction mixture increasing to 120°–190° C. in the course of 2 minutes. After the evolution of heat has ceased, the reaction mixture is cooled to 20° C., and 1 g of finely triturated sodium bicarbonate is added and is suspended in the reaction mixture by stirring. Thereafter, 100 g of water are added in one portion and the volatile components are removed by steam distillation. Cooling to 20° C. gives a clear to whitish cloudy 30% strength solution of a copolymer in water, having the properties shown in Table 4.

TABLE 3

| Example | Substances taken | | | Feed 1 | Feed 2 | | | | |
|---|---|---|---|---|---|---|---|---|---|
| | HBVE [g] | HBVE · x EO [g] | x | DEM [g] | tBPP [g] | Feed time [h] | VEG [mmol/g] | K value | SC [%] |
| 13 | 16 | 85 | 7 | 60 | 6 | 5 | 0.18 | 18 | 40 |
| 14 | 25 | 80 | 25 | 49 | 6 | 4 | 0.13 | 22 | 43 |
| 15 | 50 | 50 | 25 | 84 | 6 | 5 | 0.05 | 23 | 37 |
| 16 | 50 | 50 | 50 | 78 | 6 | 5 | 0.11 | 25 | 34 |

Preparation of copolymers of 4-hydroxyalkyl vinyl ethers and ethoxylated 4-hydroxybutyl vinyl ethers by cationic polymerization.

TABLE 4

| Example | HBVE [g] | HBVE · x EO [g] | x | max. polymer temp. reached [°C.] | K value | Turbidity point [°C.] of 1% strength aqueous solutions |
|---|---|---|---|---|---|---|
| 17 | 40 | 10 | 3 | 190 | 25 | 5 |
| 18 | 25 | 25 | 3 | 150 | 20 | 34 |
| 19 | 15 | 35 | 3 | 135 | 19 | 48 |
| 20 | 35 | 15 | 7 | 170 | 20 | 16 |
| 21 | 25 | 25 | 7 | 160 | 18 | 30 |
| 22 | 10 | 40 | 7 | 135 | 16 | 66 |
| 23 | 40 | 10 | 25 | 180 | 26 | 30 |
| 24 | 25 | 25 | 25 | 150 | 25 | 65 |
| 25 | 10 | 40 | 25 | 125 | 27 | 72 |
| 26 | 32.5 | 17.5 | 50 | 165 | 26 | 61 |
| 27 | 25 | 25 | 50 | 145 | 28 | 62 |
| 28 | 10 | 40 | 50 | 130 | 31 | 79 |

EXAMPLE 29

A monomer mixture of 15 g of 4-hydroxybutyl vinyl ether, 35 g of the adduct of 3 mol of ethylene oxide with 1 mol of 4-hydroxybutyl vinyl ether and 0.7 g of 1,4-butanediol divinyl ether is polymerized as stated in Examples 17–28, except that ⅕ of the monomer mixture is heated together with oxalic acid to 120° C. and, after the start of the polymerization, the remaining monomer mixture is metered in at a rate such that the temperature of the reaction mixture is kept at 120° C. during polymerization. A copolymer having a K value of 35 is obtained. The turbidity point of a 1% strength aqueous solution of the copolymer is 25° C.

EXAMPLE 30

Example 29 is repeated, except that the copolymerization is carried out in the absence of 1,4-butanediol divinyl ether, using 5 g of 4-hydroxybutyl vinyl ether and 45 g of the adduct of 3 mol of ethylene oxide with 1 mol of 4-hydroxybutyl vinyl ether. A copolymer having a K value of 33 is obtained. A 1% strength aqueous copolymer solution has a turbidity point of 36° C.

EXAMPLES 31–37

The starting materials shown in Table 8 are subjected to cationic copolymerization according to the preparation method stated in Example 29. In all cases, 0.15 g of oxalic acid is used as the polymerization initiator. After the end of the copolymerization, 1 g of sodium bicarbonate is added in each case to neutralize the oxalic acid. As stated in Example 29, in the preparation of polymers 31–37, too, a polymer solution is prepared by adding 100 g of water in each case. The turbidity points of 1% strength aqueous solutions and the K values of the copolymers are shown in Table 5.

TABLE 5

| Example | HBVE · x EO [g] | x | HHVE [g] | DVE | Turbidity point [°C.] 1% strength aqueous solutions | K value |
|---|---|---|---|---|---|---|
| 31 | 45 | 3 | 5 | | 27 | 37 |
| 32 | 45 | 7 | 5 | 1.8 | 45 | 29 |
| 33 | 35 | 7 | 15 | 2.8 | 19 | 40 |
| 34 | 45 | 25 | 5 | | 66 | 32 |
| 35 | 35 | 25 | 15 | | 31 | 39 |
| 36 | 45 | 50 | 5 | 0.9 | 64 | 43 |
| 37 | 40 | 50 | 10 | 0.9 | 46 | 41 |

Preparation of conventional polymers for the novel use in detergents

Polymers 1 to 3

These polymers are obtained by the general preparation method for Examples 1–5, using the amounts of starting materials shown in Table 6. The K values of the polymers are likewise shown in Table 6.

TABLE 6

| Example | Substance taken HBVE · x EO [g] | x | Surfactant A | Feed 1 DEM [g] | Surfactant A [g] | Feed 2 tBPP [g] | K value |
|---|---|---|---|---|---|---|---|
| 1 | 62 | 3 | 60 | 43 | 40 | 6 | 14 |
| 2 | 150 | 11 | 150 | 22 | 20 | 3 | 15 |
| 3 | 152 | 25 | 150 | 22 | 20 | 3 | 17 |

Polymer 4

A copolymer is prepared by the general method for Examples 6–10 by initially taking 106 g of the adduct of 7 mol of ethylene oxide with 1 mol of 4-hydroxybutyl vinyl ether in 106 g of a nonionic surfactant (reaction product of 1 mol of $C_{13}$-/$C_{15}$-alcohol with 7 mol of ethylene oxide) and adding a mixture of 43 g of diethyl maleate and 43 g of the stated nonionic surfactant as feed 1 and 6 g of tert-butyl perpivalate as feed 2. A copolymer having a K value of 14 is obtained. 100 g of water and 6 ml of 50% strength aqueous sodium hydroxide solution are then added to the copolymer, the ester groups of the copolymer being converted into carboxylate groups. The reaction mixture consists of 29% of copolymer, 29% of nonionic surfactant and 42% of water.

Polymer 5

A mixture of 150 g of the reaction product of 11 mol of ethylene oxide with 1 mol of 4-hydroxybutyl vinyl ether and 150 g of nonionic surfactant A is initially taken as described for polymer 4, and a mixture of 43 g of diethyl maleate and 43 g of the stated surfactant is used as feed 1 and 6 g of tert-butyl perpivalate as feed 2. A copolymer having a K value of 15 is obtained and is subsequently treated with 200 g of water and 10 g of 50% strength aqueous sodium hydroxide solution. The reaction mixture consists of 24% of copolymer, 24% of nonionic surfactant and 52% of water.

Polymer 6

According to the method stated in Example 11, 100 g of the adduct of 7 mol of ethylene oxide with 1 mol of hydroxybutyl vinyl ether and 100 g of polyethylene glycol having a molecular weight of 300 are initially taken and a mixture of 22 g of acrylic acid and 22 g of a polyethylene glycol having a molecular weight of 300 is added as feed 1 and 2 g of tert-butyl perpivalate as feed 2. After the copolymerization, 50 g of water and 17 g of anhydrous sodium carbonate are added. A polymer solution having a polymer content of 28% in a mixture of water and polyethylene glycol is obtained. The K value of the polymer is 40.

Polymer 7

20 g of the reaction product of 4-hydroxybutyl vinyl ether with 7 mol of ethylene oxide are heated with 20 g of polyethylene glycol having a molecular weight of 300 to 70° C. under nitrogen in the apparatus described in Example 7. A solution of 90 g of vinyl acetate and 3 g of acrylic acid in 90 g of polyethylene glycol having a molecular weight of 300 is then metered in over 1 hour. At the same time, 3 g of tert-butyl perpivalate are metered in over 1 hour. After the end of the feeds, the reaction mixture is stirred for a further hour at 70° C., water is added and volatile components are removed by passing in steam. After the reaction mixture has cooled, it is neutralized by adding sodium carbonate. The K value of the polymer is 17 (measured as a 1% strength aqueous solution). The polymer content of the solution is 32%.

Polymers 8 and 9

The components stated in Table 6 are copolymerized according to the preparation method for polymer 7. Clear copolymer solutions having the properties stated in Table 7 are obtained.

TABLE 7

| Polymer | Substance taken HBV · 7 EO [g] | Feed 1 PEG 300 4 [g] | Feed 1 AA [g] | Feed 1 PEG 300 [g] | Feed 1 VAC [g] | Feed 2 tBPP [g] | Water [g] | $Na_2CO_3$ [g] | SC [%] | K value Measured as 1% strength aqueous solutions |
|---|---|---|---|---|---|---|---|---|---|---|
| 8 | 50 | 50 | 7 | 50 | 50 | 3 | 50 | 6 | 28 | 44 |
| 9 | 80 | 80 | 13 | 50 | 20 | 3 | 50 | 11 | 32 | 45 |

Polymers 10–13

The substances shown in Table 8 are polymerized by the general method stated for Examples 13–16. The properties of the copolymers obtainable are likewise shown in Table 8.

TABLE 8

| Polymer | Substance taken HBVE · x EO [g] | x | Feed 1 DEM [g] | Feed 2 tBPP [g] | Feed time [h] | VEG [mmol/g] | K value | SC [%] |
|---|---|---|---|---|---|---|---|---|
| 10 | 106 | 7 | 43 | 6 | 5 | 0.13 | 19 | 40 |
| 11 | 112 | 11 | 32 | 6 | 5 | 0.27 | 18 | 38 |
| 12 | 114 | 25 | 32 | 6 | 5 | 0.07 | 18 | 45 |
| 13 | 100 | 50 | 10 | 7 | 6 | 0.05 | 24 | 19 |

Polymer 14

1/10 of a mixture consisting of 122 g of an adduct of 11 mol of ethylene oxide with 1 mol of methanol, 100 g of an adduct of 7 mol of ethylene oxide with 1 mol of 4-hydroxybutyl vinyl ether and 22 g of acrylic acid is initially taken in the apparatus of Examples 1–5, and 0.3 g of tert-butyl perpivalate is added. The polymerization is started by heating to 75° C., and the remaining monomer mixture is added at a rate such that the temperature does not exceed 80° C. After stirring has been carried out for a further hour at 75° C., the vinyl ether content is determined as 0.006 mol by means of iodine titration. The polymer is neutralized by adding a solution of 40 g of sodium carbonate decahydrate and 75 g of water. The resulting polymer solution is brought to a solids content of 55%. The unneutralized polymer has a K value of 14.

Polymers 15–17

A surfactant-free polymer is prepared similarly to the description of polymer 4 by preparing a mixture of an adduct of ethylene oxide with 4-hydroxybutyl vinyl ether and diethyl maleate and polymerizing this mixture by means of tert-butyl perpivalate at 75° C. After the addition of 100 g of water to the polymer, steam is passed into the solution and the polymer is then subjected to an alkaline aftertreatment by adding 25% strength aqueous sodium hydroxide solution at 20° C. The starting materials and amounts are shown in the Table below:

Polymers 18–20

1/10 of a mixture consisting of the adduct of ethylene oxide with 4-hydroxybutyl vinyl ether, polyethylene oxide having a molecular weight of 300 and acrylic acid is initially taken at 75° C. in the apparatus of Examples 1–5, and polymerization is initiated by adding 1/10 of the amount of initiator. The remaining monomer mixture is metered in at a rate such that the temperature can be kept at 80° C. After the end of the polymerization, the K value of the polymer is determined and the polymer is quantitatively neutralized by adding stoichiometric amounts of aqueous sodium carbonate solution. Dilution with water gives a clear solution having the stated polymer contents:

| Polymer | HBVE* x EO [g] | x | Feed 1 AA [g] | PEG 300 [g] | Feed 2 tBPP [g] | K value | Polymer content [%] |
|---|---|---|---|---|---|---|---|
| 18 | 100 | 3 | 29 | 129 | 3 | 16 | 25 |
| 19 | 100 | 11 | 15 | 115 | 3 | 12 | 26 |
| 20 | 100 | 11 | 30 | 130 | 3 | 14 | 26 |

Hydrolysis of polyacetals

The copolymers obtained according to Examples 30, 32, 34 and 36 were investigated for hydrolytic degradation. For this purpose, the decrease in the viscosity of 5% strength solutions of the polymers in water at the corresponding pH was monitored. The measuring instrument used was an Ubbelohde viscometer. The measurements were carried out at 25° C. The pH was as follows:

pH 2.5: 1% strength aqueous acetic acid pH 4.6: Equimolar mixture of acetic acid and sodium acetate pH 5.3: Addition of 0.1% strength acetic acid pH 6.2: Addition of 0.1% strength acetic acid.

The decrease in the efflux time in the viscometer at 25° C. was characterized by the half life $T_{half}$ and the end value of the efflux time (time for complete depolymerization): $T_{end}$. The following hydrolysis times were determined:

| Polymer | HBVE* x EO [g] | x | Feed 1 DEM [g] | Feed 2 tBPP [g] | K value | 25% strength sodium hydroxide solution [g] | SC [%] |
|---|---|---|---|---|---|---|---|
| 15 | 100 | 7 | 40 | 3 | 17 | 45 | 40 |
| 16 | 100 | 3 | 70 | 3 | 15 | 90 | 29 |
| 17 | 100 | 11 | 34 | 2 | 15 | 35 | 42 |

TABLE 9

Hydrolysis of copolymers obtained according to Examples 30, 32, 34 and 36

| Copolymer according to Example | pH = 2.5 $t_{half}$ [min] | pH = 2.5 $t_{end}$ [min] | pH = 4.6 $t_{half}$ [h] | pH = 4.6 $t_{end}$ [h] | pH = 5.3 $t_{half}$ [h] | pH = 5.3 $t_{end}$ [h] | pH = 6.2 $t_{half}$ [days] | pH = 6.2 $t_{end}$ [days] |
|---|---|---|---|---|---|---|---|---|
| 30 | 8 | 90 | 1 | 24 | — | — | — | — |
| 32 | 8 | 120 | 2 | 48 | 14 | 100 | 4 | 14 |
| 34 | 8 | 120 | 1 | 24 | 2 | 30 | 2 | >14 |
| 36 | 9 | 240 | 2 | 20 | — | — | 10 | >14 |

Use Examples

EXAMPLES 38-42

A mixture of the anhydrous surfactant A (adduct of 7 mol of ethylene oxide with 1 mol of a $C_{13}/C_{15}$-alcohol mixture) and polymer 4 described above is prepared. The amount of polymer 4 in the mixture is 5%. Table 10 shows the viscosities of the described mixture of surfactant A and polymer 4 for different contents of water. As is evident therefrom, polymer 4 acts as a viscosity depressant for the water-containing surfactant A.

TABLE 10

Determination of the viscosity depressant effect of polymer 4

Measuring apparatus: Brookfield viscosity

| | | | | Viscosity [mPa · s] | |
|---|---|---|---|---|---|
| Example | Water content [%] | Spindle No. | Speed (rpm) | Surfactant A (Comparison) | Mixture of 95% of surfactant A and 5% of polymer (according to the invention) |
| 38 | 0 | 1 | 60 | 65 | 65 |
| 39 | 20 | 4 | 6 | 46000 | 90 |
| 40 | 40 | 4 | 6 | 25000 | 2800 |
| 41 | 60 | 4 | 3 | 158000 | 744 |
| 42 | 80 | 3 | 60 | 1000 | 420 |

EXAMPLES 43-46

The amounts of polymer 4 stated in Table 1 are added to a 40% strength aqueous solution of surfactant A and the viscosity is measured in each case. As can be seen from Table 11, the addition of polymer 4 results in a substantial reduction in the viscosity of the aqueous solution of the surfactant A.

TABLE 11

| Example | Comparative Example | Amount of polymer 4 used, based on surfactant A [% by weight] | Viscosity [mPa · s] |
|---|---|---|---|
| | 1 | 0 | 158000 |
| 43 | | 1 | 12800 |
| 44 | | 2.5 | 11340 |
| 45 | | 5 | 744 |
| 46 | | 10 | 780 |

EXAMPLES 47-50

An aqueous solution which contains polymer 4 in the concentrations stated in Table 12 is initially taken, and nonionic surfactant is added, while stirring, in an amount such that a 40% strength aqueous solution of surfactant A results. The viscosities of the mixtures obtained are shown in Table 12.

TABLE 12

| Example | Comparative Example | Amount used | Spindle No. | Shear rate [rpm] | Viscosity [mPa · s] |
|---|---|---|---|---|---|
| | 1 | 0 | 4 | 3 | 158000 |
| 47 | | 0.5 | 4 | 6 | 15000 |
| 48 | | 1.0 | 3 | 12 | 2500 |
| 49 | | 2.0 | 3 | 30 | 1000 |
| 50 | | 4.0 | 3 | 30 | 640 |

EXAMPLE 51 a) A 5% strength solution of polymer 4 in anhydrous surfactant A is diluted to 40% by weight by adding water, and the viscosity of the mixture is measured. It is 744 mPa.s.

b) The unhydrolyzed polymer 4, ie. the copolymer obtained by free radical polymerization of the adduct of 7 mol of ethylene oxide with 1 mol of hydroxybutyl vinyl ether and diethyl maleate, in the form of a 5% strength solution in anhydrous substance A, is diluted to 40% by weight by adding water. The viscosity of this mixture is 10,260 mPa.s.

As is evident from Comparative Example 1, the viscosity of a 40% strength aqueous solution of surfactant A without added polymer is, in contrast, 158,000 mPa.s.

Because of the viscosity depressant effect, the polymers to be used according to the invention are important assistants in the preparation of low-phosphate and phosphate-free detergents and cleaning agents. By using these assistants, it is possible to increase the slurry concentration in the crusher to at least 80%. This means better cost-efficiency due to more advantageous utilization of the spray tower and a saving of energy because less water has to be evaporated. The homogenizing and viscosity depressant effect of the polymers to be used according to the invention is illustrated below by viscosity measurements on detergent formulations. The measuring instrument used is a rheometer from Physika. The measuring system is a Z 3 DIN type. A suspension of 80% by weight of detergent components and 20% by weight of water is used as the detergent slurry. The polymers stated in Table 13, in an amount of 2% by weight, based on the detergent formulation, are added as viscosity depressants.

The detergent for preparing the slurry has the following composition:

10% by weight of dodecylbenzenesulfonate in the form of the sodium salt,

6% by weight of surfactant A,

30% by weight of zeolite A,

10% by weight of sodium carbonate,

5% by weight of sodium metasilicate . $5H_2O$ and

39% by weight of sodium sulfate.

All the detergent components stated above and the polymers shown in Table 13 were stirred into water with the aid of a paddle stirrer so that a mixture consisting of 80 parts by weight of the detergent components described above, 18 parts by weight of water and 2 parts by weight of polymer was formed. The viscosities of the slurries were measured at a shear rate of 45 second$^{-1}$. The results are shown in Table 13.

TABLE 13

| Example | Comparative Example | Substance added | Viscosity [mPa·s] | Visual appearance of the slurries |
|---|---|---|---|---|
| | 2 | none | 28700 | very pasty |
| | 3 | polycarboxylate[1] | 4130 | pasty, inhomogeneous |
| | | Polymer obtainable according to Example | | |
| 51 | | 9 | 1135 | low-viscosity, homogeneous |
| 52 | | 6 | 1430 | low-viscosity, homogeneous |
| 53 | | 7 | 1380 | low-viscosity, homogeneous |
| 54 | | 10 | 1590 | low-viscosity, homogeneous |
| 55 | | 12 | 2100 | free-flowing, homogeneous |
| | | Polymer | | |
| 56 | | 6 | 828 | low-viscosity, homogeneous |
| 57 | | 14 | 437 | low-viscosity, homogeneous |
| 58 | | 15 | 126 | low-viscosity, homogeneous |
| 59 | | 16 | 90 | low-viscosity, homogeneous |
| 60 | | 17 | 160 | low-viscosity, homogeneous |
| 61 | | 18 | 170 | low-viscosity, homogeneous |
| 62 | | 19 | 640 | low-viscosity, homogeneous |
| 63 | | 20 | 430 | low-viscosity, homogeneous |

[1]The polycarboxylate used was a commercial copolymer of acrylic acid and maleic acid, having a molecular weight of 70,000.

The measured values clearly show that the polymers have a homogenizing and viscosity-depressant effect on the detergent slurries.

The effect of the homo- and copolymers to be used according to the invention in detergents on the primary washing effect and redeposition is demonstrated in the Examples which follow. The relevant experiments are carried out under the following conditions:

Washing apparatus Launder-o-meter

Washing temperature 60° C.

Water hardness 3 mmol Ca/l=16.8° d, Ca:Mg ratio=3:1

Washing time 30 min (including heat-up time)

Wash cycles 4

Detergent metering 6 g/l

Liquor ratio 1:14.3

Fabric

White fabric: Cotton/polyester fabric Polyester fabric

Soiled fabric: WKF 20 D (Wäschereiforschung Krefeld) (replaced after each wash)

Whiteness measurement using an Etrepho 2000 from Datacolor, in % reflectance

Whiteness of the unwashed fabric:

Cotton/polyester 80.4

Polyester 78.0

WFK 20 D 37.8

The differences in whiteness of the individual fabrics before and after the wash are stated in each case. The greater the difference in whiteness for the soiled fabric WFK 20 D, the higher the primary washing effect. The smaller the differences for the white fabrics, the better the antiredeposition effect.

For comparison, a polymer-free detergent formulation was tested.

Formulation A:

10% of sodium dodecylbenzenesulfonate, 50% strength in water

3% of the reaction product of 1 mol of $C_{13}/C_{15}$-oxo alcohol and 7 mol of ethylene oxide (surfactant A)

2% of polypropylene glycol MW 600

77% of water

8% of polymer according to Table 14 or 15.

The effects achieved with regard to redeposition and primary washing effect when the polymers to be used according to the invention are employed are shown in Tables 14 and 15. It is evident from there that the novel polymers and the polymers to be used according to the invention substantially improve the primary washing effect of the detergent formulation. At the same time, an improvement in the antiredeposition effect is also observed in some cases. All polymers to be used according to the invention could be incorporated without problems into the detergent formulation A and, in contrast to the formulation which contained a polycarboxylate, led to stable, homogeneous solutions.

TABLE 14

| Example | Addition of polymer prepared according to Example No. | Polymer No. | Primary washing effect WFK 20 D | Redeposition Polyester | PES/cotton |
|---|---|---|---|---|---|
| 64 | | 1 | 20,7 | 0,9 | 13,3 |
| 65 | | 2 | 19,1 | 0,1 | 13,0 |
| 66 | | 3 | 20,0 | 1,0 | 12,5 |
| 67 | 1 | | 21,1 | 2,4 | 12,6 |
| 68 | 2 | | 22,6 | 1,1 | 12,9 |
| 69 | 3 | | 23,0 | 0,7 | 11,9 |
| 70 | 4 | | 22,2 | 0,7 | 11,9 |
| 71 | 5 | | 23,7 | 3,4 | 14,8 |
| 72 | 6 | | 21,2 | 1,2 | 11,7 |
| 73 | 7 | | 19,4 | 0,7 | 10,7 |
| 74 | 8 | | 19,4 | 0,7 | 11,6 |
| 75 | 9 | | 20,2 | 1,9 | 10,8 |
| 76 | 10 | | 20,7 | 1,6 | 11,1 |
| 77 | | 4 | 18,9 | 2,8 | 12,0 |
| 78 | | 5 | 18,3 | 3,0 | 13,3 |
| 79 | | 7 | 16,4 | 1,0 | 7,9 |
| 80 | | 8 | 17,8 | 0,5 | 8,6 |
| 81 | | 9 | 17,5 | 0,2 | 10,2 |
| 82 | | 10 | 15,2 | 0,5 | 8,3 |
| 83 | | 11 | 16,7 | 0,9 | 6,5 |
| 84 | | 12 | 17,4 | 1,0 | 6,8 |
| 85 | | 13 | 15,8 | 0,4 | 5,9 |
| 86 | 13 | | 16,8 | 1,2 | 7,5 |
| 87 | 14 | | 16,2 | 1,5 | 7,4 |
| 88 | 15 | | 16,1 | 0,8 | 7,3 |
| 89 | 16 | | 17,4 | 0,9 | 7,6 |
| 90 | 17 | | 22,2 | — | 13,3 |
| 91 | 18 | | 21,2 | — | 8,5 |
| 92 | 19 | | 20,8 | — | 10,7 |
| 93 | 20 | | 21,8 | — | 10,1 |
| 94 | 21 | | 22,0 | — | 8,4 |
| 95 | 22 | | 20,6 | — | 9,6 |
| 96 | 23 | | 28,0 | — | 11,9 |
| 97 | 24 | | 24,8 | — | 10,5 |
| 98 | 25 | | 22,2 | — | 7,2 |
| 99 | 26 | | 26,5 | — | 11,2 |
| 100 | 27 | | 26,3 | — | 11,5 |
| 101 | 28 | | 19,1 | — | 10,0 |
| 102 | 30 | | 21,6 | 4,4 | 12,1 |
| 103 | 29 | | 24,5 | 12,3 | 13,6 |
| 104 | 31 | | 22,2 | 6,5 | 10,3 |

TABLE 14-continued

| Addition of polymer prepared according to Example No. | Polymer No. | Primary washing effect WFK 20 D | Redeposition Polyester | Redeposition PES/cotton |
|---|---|---|---|---|
| 105 | 32 | 17,8 | 1,3 | 8,0 |
| 106 | 33 | 24,2 | 4,3 | 11,4 |
| 107 | 34 | 16,2 | 2,0 | 8,3 |
| 108 | 35 | 22,1 | 1,5 | 7,8 |
| 109 | 36 | 17,9 | 5,6 | 11,2 |
| 110 | 37 | 18,9 | 6,1 | 11,4 |
| Comparative Example | | | | |
| 4 | no addition | 14,7 | 2,9 | 10,3 |
| 5 | addition of surfactant A in an amount of 4% | 16,9 | 6,9 | 15,6 |

We claim:

1. A copolymer of a hydroxyalkyl vinyl ether, said copolymer being formed by cationic or free radical polymerization of monomers, comprising:

a) from 90 to 10% by weight of a hydroxyalkyl vinyl ether selected from the group consisting of hydroxyether vinyl ether, 3-hydroxpropyl vinyl ether, 2-hydroxypropyl vinyl ether, 2-hydroxy-2-methylpropyl vinyl ether, 2-hydroxybutyl vinyl ether, 3-hydroxybutyl vinyl ether, 4-hydroxybutyl vinyl ether, 2-hydroxy-2-ethylethyl vinyl ether, 3-hydroxy-3-methylpropyl vinyl ether, 3-hydroxy-2-methylpropyl vinyl ether, 3-hydroxy-1-methylpropyl vinyl ether, hydroxypentyl vinyl ether, 6-hydroxyhexyl vinyl ether, 4-hydroxy-1,4-dimethylbutyl vinyl ether, 2-hydroxycyclohexyl vinyl ether, 3-hydroxycyclohexyl vinyl ether, 4-hydroxycyclohexyl vinyl ether, hydroxylheptyl vinyl ether, hydroxyoctyl vinyl ether, 4-(hydroxymethyl)-cyclohexyl- methyl vinyl ether and hydroxydecyl vinyl ether;

b) from 10% to 90% by weight of an adduct of a $C_2$–$C_4$-alkylene oxide with said hydroxyalkyl vinyl ether of clause a); and c) other copolymerizable monomers from 0 to up to a total of 100% by weight of (a), (b), and (c).

2. The copolymer of claim 1, wherein said monomer (a) is 4-hydroxybutyl vinyl ether, said monomer (b) is the reaction product of 1 mol of 4-hydroxybutyl vinyl ether with 7 mol of ethylene oxide, the amount of said monomer (c) used is zero, and said copolymer is prepared by cationic copolymerization using oxalic acid as the initiator for the copolymerization.

3. The copolymer of claim 1, wherein said monomer (b) is an adduct of 2 to 60 mol of a $C_2$–$C_4$-alkylene oxide with 1 mol of hydroxyalkyl vinyl ether.

4. The copolymer of claim 1, said copolymer being water soluble or readily water dispersible.

5. The copolymer of claim 3, said copolymer being water soluble or readily water dispersible.

6. The copolymer as claimed in claim 1, said copolymer being formed by free radical copolymerization of monomers comprising:

(a) 90 to 10% by weight of hydroxybutyl vinyl ether, (b) from 10% to 90% by weight of an adduct of from 1 to 100 mol of ethylene oxide with one mol of hydroxybutyl vinyl ether, and (c) other copolymerizable monomers from 0 to up to a total of 100% by weight of (a), (b) and (c).

7. The copolymer as claimed in claim 1, said copolymer being formed by cationic copolymerization of:

(a) from 90 to 10% by weight of hydroxybutyl vinyl ether, (b) from 10% to 90% by weight of an adduct of from 1 to 100 mol of ethylene oxide with one mol of hydroxybutyl vinyl ether, and (c) other copolymerizable monomers from 0 to up to a total of 100% by weight of (a), (b), and (c), said copolymerizable monomers being selected from the group consisting of divinyl ether, compounds having two or more OH groups and mixtures thereof.

* * * * *